United States Patent
Chou et al.

(10) Patent No.: US 7,933,360 B2
(45) Date of Patent: Apr. 26, 2011

(54) METHOD FOR EVALUATING SIGNAL TRANSMISSION QUALITY

(75) Inventors: Yu-Pin Chou, Miao-Li Hsien (TW);
Chao-Hsin Lu, Tao-Yuan Hsien (TW);
Hsu-Jung Tung, Kao-Hsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 1103 days.

(21) Appl. No.: 11/162,571

(22) Filed: Sep. 15, 2005

(65) Prior Publication Data

US 2006/0074682 A1    Apr. 6, 2006

(30) Foreign Application Priority Data

Sep. 17, 2004    (TW) ............................. 93128193 A

(51) Int. Cl.
*H03K 9/00*        (2006.01)
*H04L 27/00*       (2006.01)

(52) U.S. Cl. ... 375/316; 375/229; 375/354; 375/240.01; 382/275; 382/172; 382/270; 348/180; 348/241; 345/87; 345/98

(58) Field of Classification Search .................. 375/360, 375/354, 355; 345/213

See application file for complete search history.

(56) References Cited

U.S. PATENT DOCUMENTS

| | | | | |
|---|---|---|---|---|
| 4,667,065 A * | 5/1987 | Bangerter | ............. | 379/351 |
| 4,918,540 A * | 4/1990 | Ohtani | ............. | 382/239 |
| 5,576,738 A * | 11/1996 | Anwyl et al. | ............. | 345/212 |
| 5,905,769 A | 5/1999 | Lee et al. | | |
| 5,987,085 A * | 11/1999 | Anderson | ............. | 375/374 |
| 5,991,283 A * | 11/1999 | Saunders | ............. | 370/333 |
| 6,335,718 B1 * | 1/2002 | Hong et al. | ............. | 345/98 |
| 6,546,149 B1 * | 4/2003 | Ruggiero et al. | ............. | 382/275 |
| 6,559,838 B1 * | 5/2003 | Lonoce et al. | ............. | 345/212 |
| 6,944,804 B1 * | 9/2005 | Kim et al. | ............. | 714/704 |
| 7,408,993 B2 * | 8/2008 | Webster | ............. | 375/257 |
| 7,649,993 B2 * | 1/2010 | Tsuchida | ............. | 380/203 |
| 2003/0048139 A1 * | 3/2003 | Chien et al. | ............. | 331/11 |
| 2004/0080671 A1 * | 4/2004 | Siemens et al. | ............. | 348/473 |
| 2006/0262229 A1 * | 11/2006 | Takeda et al. | ............. | 348/725 |
| 2009/0002292 A1 * | 1/2009 | Koo et al. | ............. | 345/87 |

* cited by examiner

*Primary Examiner* — Shuwang Liu
*Assistant Examiner* — Gina McKie
(74) *Attorney, Agent, or Firm* — Thomas, Kayden, Horstemeyer & Risley, LLP

(57) ABSTRACT

A method to assess signal transmission quality and the adjust method thereof are proposed. First, different time points of a control signal at a receiving end are acquired and the number of signal transitions in a predetermined time interval is counted. Next, the number of signal transitions is recorded and compared to a reference value to obtain a comparison result. The quality of the control signal is then determined based on the comparison result. The parameter setting of the receiving end is adjusted according to the quality of the control signal received by the receiving end to get a better performance setting.

16 Claims, 4 Drawing Sheets

METHOD FOR EVALUATING SIGNAL TRANSMISSION QUALITY

FIELD OF THE INVENTION

The present invention relates to signal transmission quality and, more particularly, to a method for evaluating signal transmission quality.

BACKGROUND OF THE INVENTION

The DVI (Digital Visual Interface) standard is a standard for a graphics card communicating with a monitor. The DVI standard adopts transmission minimized differential signaling (TMDS) for data transmission between the graphics card and the monitor. Digital signals (including control and data information) generated by a graphics card are sent from a transmitting end through a TMDS channel (including four data lines: three data signals (RGB) and a clock signal) to a receiving end. After decoding the digital signals, the decoded signals are transferred to a digital display circuit for displaying an image on the monitor.

There are various situations (e.g., different transmission line lengths, high and low frequencies, and so on) during the process of signal transmission so that it is inappropriate for the circuits at the receiving end using the same setting to receive data under different situations. Moreover, because the transmitted data are image data, the receiving end is not able to know what the input data are and whether the input data are correct. The receiving end thus can't make the optimized adjustment corresponding to the present situation.

A conventional data recovery method for improving the signal quality at the receiving end is disclosed in U.S. Pat. No. 5,905,769. This method, however, can't effectively make the optimized adjustment in accordance with the present situation.

SUMMARY OF THE INVENTION

An object of the present invention is to provide a method to evaluate signal transmission quality.

An object of the present invention is to provide a method to adjust the parameter of the circuit at the receiving end according to a result of evaluating signal transmission quality.

According to the present invention, a method for assessing the signal transmission quality comprises: receiving a digital signal at a receiving end from a transmitting end via a channel; counting a number of transitions of the digital signal in a predetermined time interval; and determining signal transmission quality according to the number of transitions of the digital signal.

Moreover, the method may further comprise a step of selecting a setting for adjusting the parameter of the circuit at the receiving end according to the signal transmission quality.

The various objects and advantages of the present invention will be more readily understood from the following detailed description when read in conjunction with the appended drawing, in which:

DETAILED DESCRIPTION OF THE PREFERRED EMBODIMENTS

The present invention will be exemplified with but not limited to a DVI interface below.

Because there are various situations in a channel such as the impedance of a transmitting end, the length of a transmission line, the transmission speed, and so on, it is difficult for a receiving end to use the same setting for receiving signals in various situations. The present invention makes use of a digital control signal sent via the channel to the receiving end to assess the quality of the digital control signal and adjust the setting of the circuit at the receiving end based on the assessment result.

Figure 1:
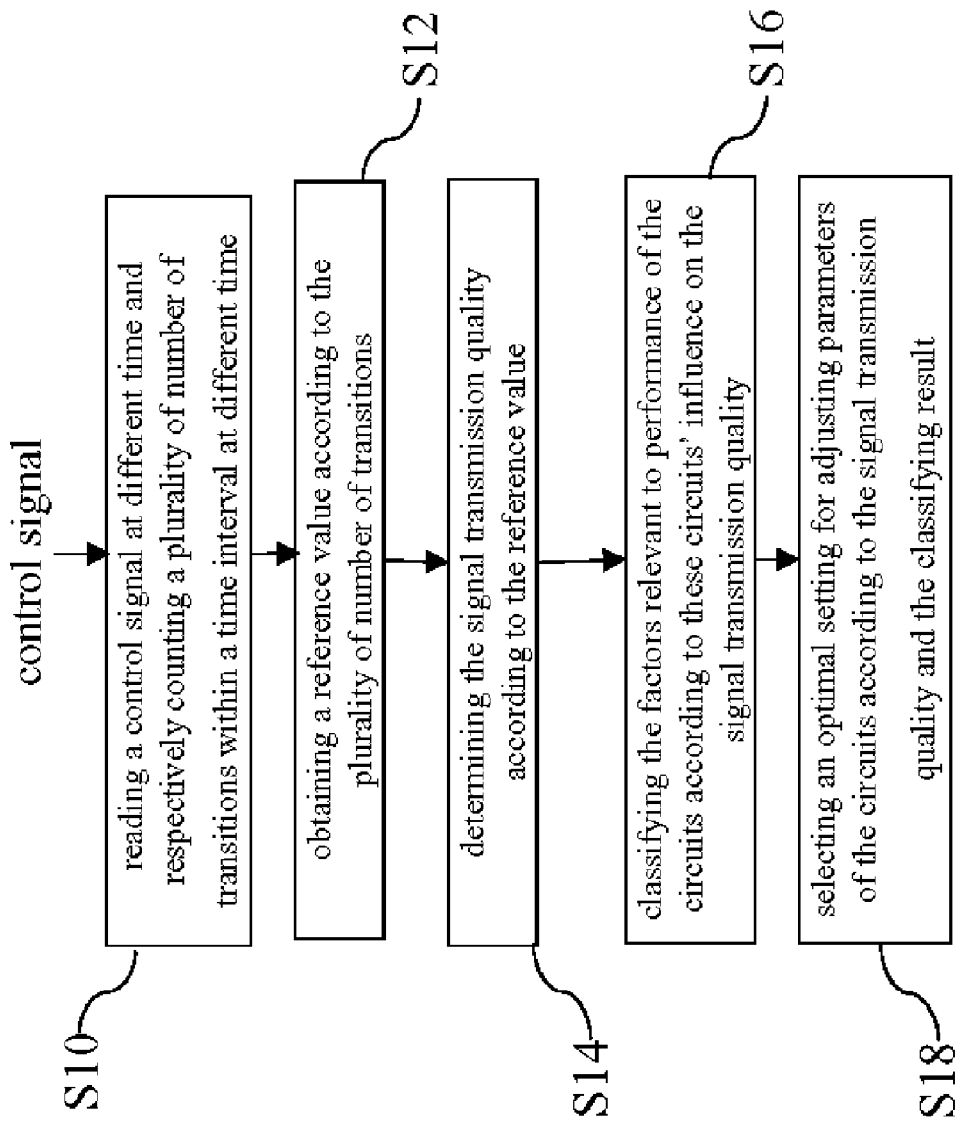
FIG. 1 is a flowchart of assessing signal transmission quality and performing adjustment according to an embodiment of the present invention.

FIG. 1 shows an embodiment of the present invention. As shown in FIG. 1, a method for evaluating signal transmission quality comprises the following steps:

Step S10: reading a control signal with a format at different time, in which the control signal such as a HS (horizontal synchronization) signal, a VS (vertical synchronization) signal, a DE (data enable) signal, a HDCP (high-bandwidth digital content protection interface) or a HDMI signal (high definition multimedia interface) is transmitted from a transmitting end to a receiving end via a channel, and respectively counting a plurality of number of transitions within a time interval at different time;

Step S12: obtaining a reference value such as the difference between the maximum and the minimum of the plurality of number of transitions or/and the average of the plurality of number of transitions;

Step S14: determining the signal transmission quality according to the reference value obtained by step 12;

Step S16: classifying the factors relevant to performance of the circuits at the receiving end according to the effect of the circuits on the signal transmission quality; and Step S18: selecting an optimal setting for adjusting parameters according to the signal transmission quality and the classifying result, where the circuits include, but are not limited to, an equalizer, an impedance matching circuit, a circuit for tuning sampling phase, and a phase lock loop. A linear search, binary tree search, or importance search may be used for selecting the best setting.

In this embodiment of the present invention, smaller difference or average corresponds to a better signal transmission quality.

In this embodiment of the present invention, a plurality of settings for the circuits at the receiving end are sequentially utilized such that steps S10-S14 are performed repeatedly according to each of the plurality of settings, so as to obtain a plurality of signal transmission quality values. Additionally, these signal transmission quality values corresponding to the plurality of settings are used in step S18 for selecting the optimal setting among the plurality of settings. Besides, the factor of step S16 that has substantial effect on the signal transmission quality may be first considered to introduce the plurality of settings.

Figure 2:
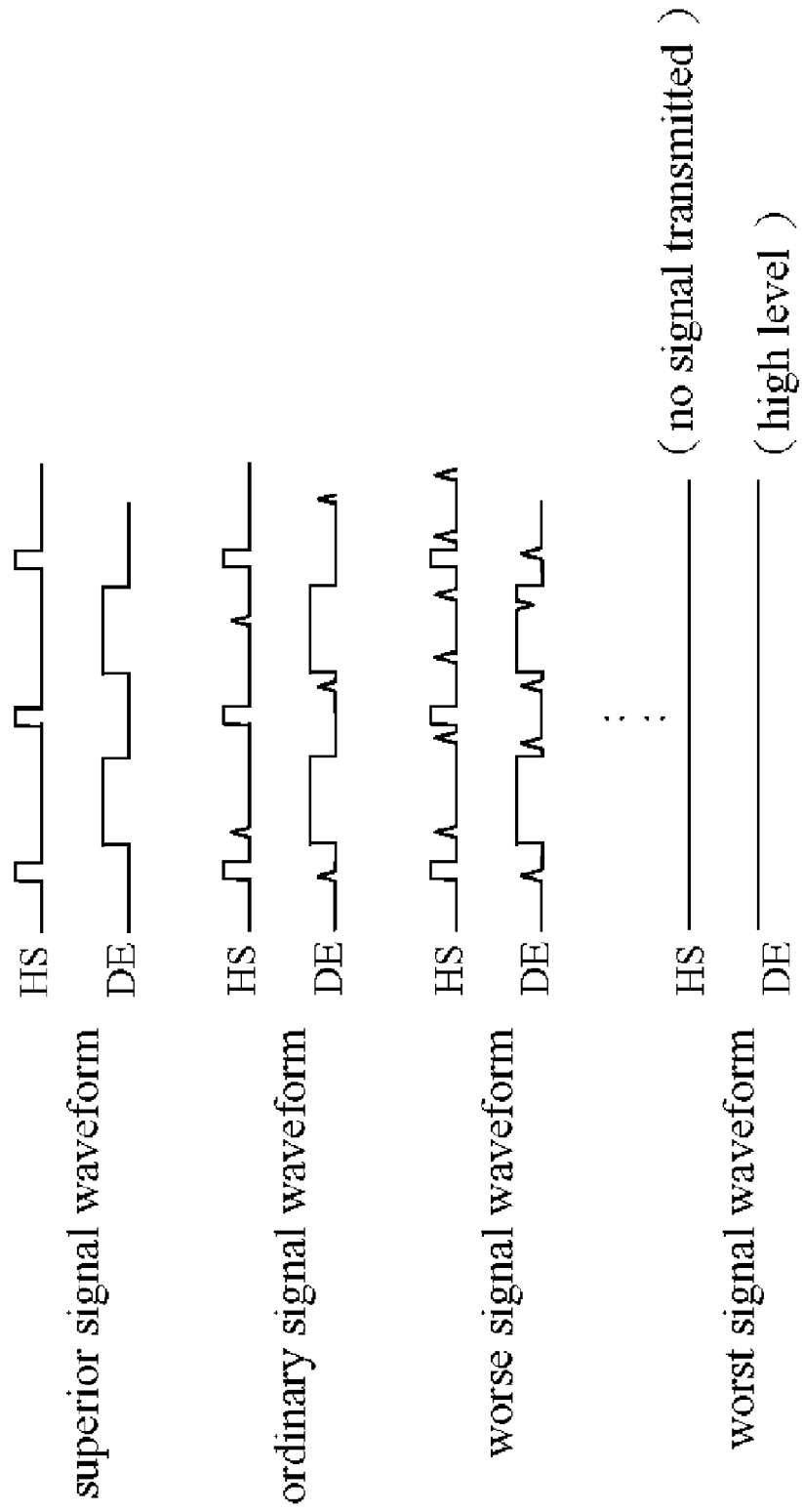
FIG. 2 shows a plurality of waveforms respectively corresponding to different signal transmission quality according to the present invention.

In another embodiment of the present invention, a plurality of control signals such as the HS signal and the DE signal are read and respectively used for executing step S10 to step S18. These control signals may be classified according to the signal transmission quality as shown in FIG. 2.

In another embodiment of the present invention, step 12 is for comparing the plurality of number of transitions with an ideal number of transitions, respectively.

The above embodiments can be exploited regardless of the magnitude of frequency of the control signal.

Figure 3:
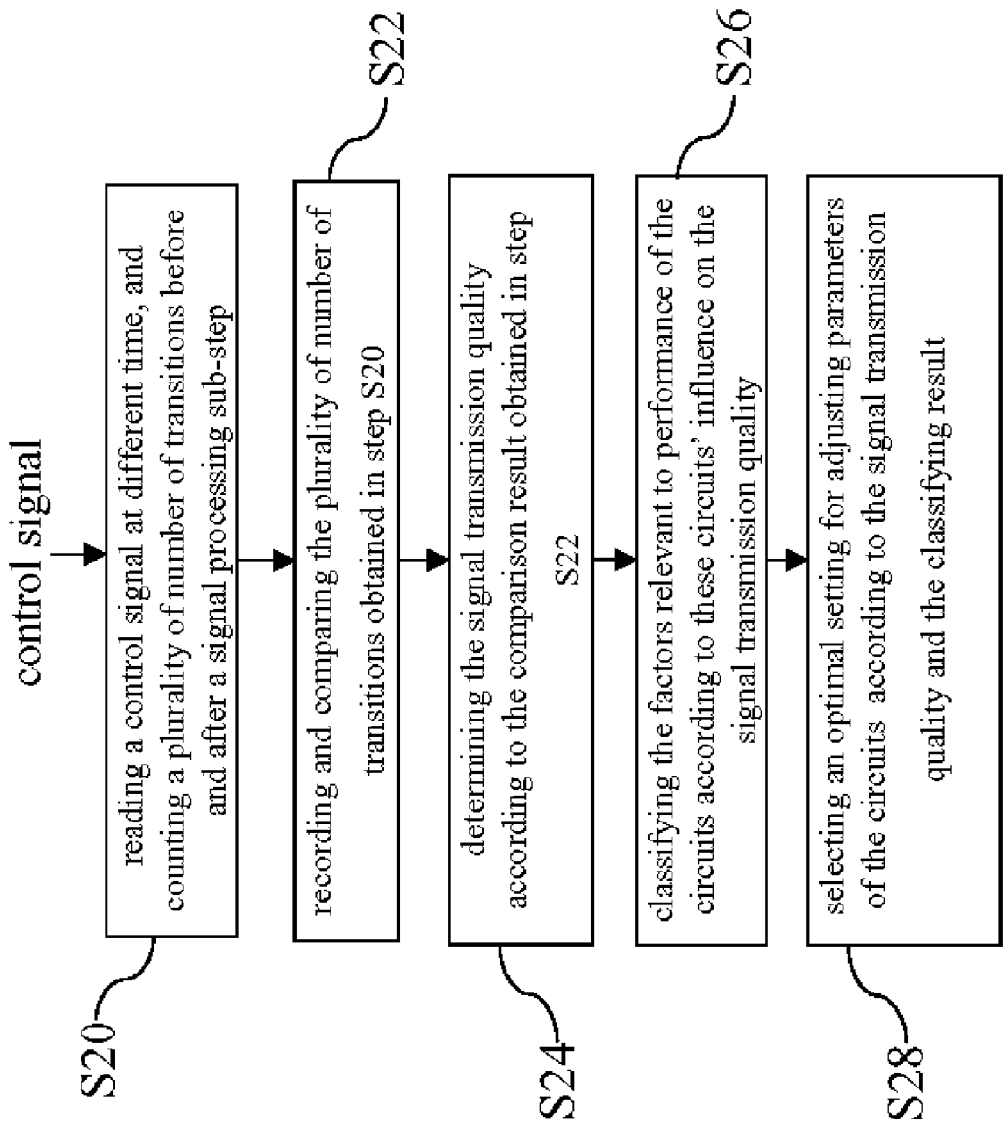
FIG. 3 is a flowchart of assessing signal transmission quality and performing adjustment according to another embodiment of the present invention.
Figure 4:
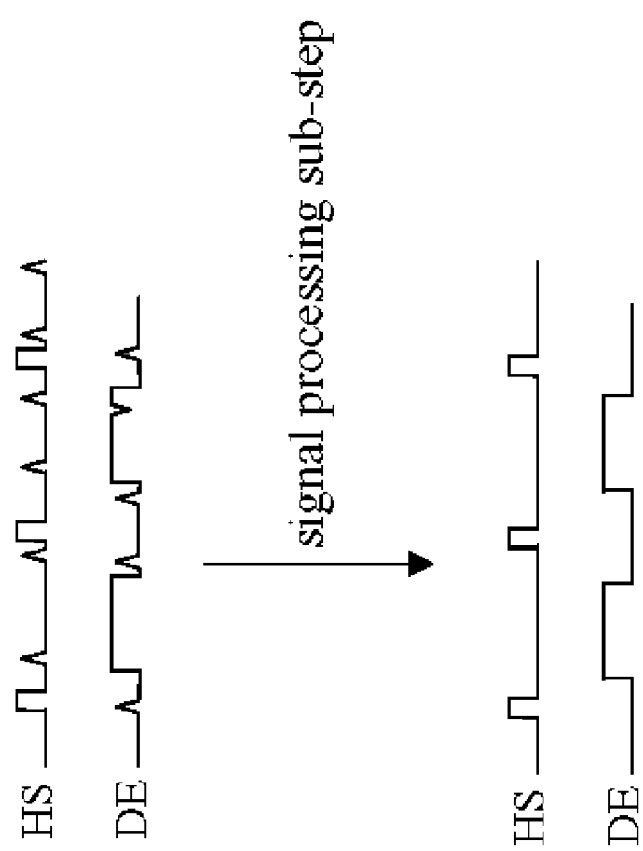
FIG. 4 shows the waveforms of control signals obtained before and after signal processing of the present invention.

In another embodiment of the present invention as shown in FIG. 3, step S20 comprises a signal processing sub-step performing before another sub-step of step S20 for counting a plurality of number of transitions. This signal processing sub-step is for debouncing or de-glitch. Please refer to FIG. 4, which shows an embodiment reading the HS and DE control signals and performing the signal processing sub-step on these signals in step S20 of FIG. 3. The plurality of number of transitions respectively corresponding to the HS and DE signals are counted before and after the signal processing sub-step. The counting result obtained before and after the signal processing sub-step are recorded and compared in step S22, so as to get comparison results such as the differences between the maximums and minimums of the plurality of number of transitions. That is, the comparison results are the function of the plurality of number of transitions corresponding to the HS and DE signals obtained before and after the signal processing sub-step. The signal transmission quality of the control signals like the HS signal and the DE signal at the receiving end is determined in step S24 based on the comparison results. In this embodiment, the closer the maximum among the plurality of number of transitions is to the minimum of the plurality of number of transitions obtained after the signal processing step, the more ideal the control signal at the receiving end is, and vice versa. The signal transmission quality can thus be assessed. The subsequent steps S26 and S28 are the same as those in the previous embodiment and thus will no longer be described below.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A method of configuring a digital visual receiver circuit, comprising:
   processing a received digital visual signal with the receiver circuit;
   adjusting a plurality of settings of the receiver circuit to thereby generate a plurality of different processing results, wherein each setting causes a different processing result;
   counting a number of transitions of a control signal in the digital visual signal during a time interval for each adjusted setting;
   comparing the number of transitions counted while utilizing each adjusted setting with a reference number of transitions;
   configuring the receiver circuit to utilize an adjusted setting that results in a minimal difference between the number of transitions counted and the reference number of transitions; and
   classifying factors relevant to performance of the receiver circuit according to influence on signal transmission quality;
   wherein adjusting the settings of the receiver circuit is performed in an order based on the influence on signal transmission quality, wherein settings corresponding to factors having a greater influence are firstly adjusted.

2. The method of claim 1, further comprising counting a number of pre-processing transitions during a time interval of the control signal before processing the digital visual signal and utilizing the counted number of pre-processing transitions as the reference number of transitions.

3. The method of claim 2, wherein processing the digital visual signal comprises processing the control signal to reduce a noise component of the control signal by at least one of debouncing processing or deglitch processing.

4. The method of claim 1, wherein processing the digital visual signal comprises equalizing the digital visual signal with an equalizer circuit, and the settings correspond to parameters of the equalizer circuit.

5. The method of claim 1, wherein processing the digital visual signal comprises impedance matching the digital visual signal with an impedance matching circuit, and the settings correspond to parameters of the impedance matching circuit.

6. The method of claim 1, wherein processing the digital visual signal comprises sampling the digital visual signal with a sampling circuit, and the settings correspond to parameters of the sampling circuit.

7. The method of claim 1, wherein processing the digital visual signal comprises locking to a frequency of the digital visual signal with a phase lock loop circuit, and the settings correspond to parameters of the phase lock loop circuit.

8. The method of claim 1, wherein the reference number of transitions is a predetermined value being an ideal number of transitions.

9. The method of claim 1, further comprising:
   counting a plurality of a number of transitions of the control signal during a plurality of time intervals of the control signal for each setting to thereby obtain an average number of transitions of the control signal at each setting;
   comparing the average number of transitions at each setting with the reference number of transitions; and
   adjusting the receiver circuit to utilize the setting that results in a minimal difference between the average number of transitions of the control signal and the reference number of transitions.

10. The method of claim 1, further comprising:
    counting a plurality of a number of pre-processing transitions of the control signal during a plurality of time intervals of the control signal before processing the digital visual signal to thereby determine a maximum number of pre-processing transitions before processing the digital visual signal;
    counting a plurality of a number of post-processing transitions of the control signal during a plurality of time intervals of the control signal for each setting to thereby determine a minimum number of transitions of the control signal at each setting;
    comparing the maximum number of transitions of the control signal before processing the digital visual signal with the minimum number of transitions of the control signal at each setting; and
    adjusting the receiver circuit to utilize the setting that results in a minimal difference between the maximum number of transitions of the control signal before processing the digital visual signal and the minimum number of transitions of the control signal after processing the digital visual signal.

11. The method of claim 1, wherein the control signal is at least one of a horizontal synchronization (HS) signal, a vertical synchronization (VS) signal, and a data enable (DE) signal.

12. The method of claim 1, wherein the control signal is a digital control signal of the high-bandwidth digital content protection (HDCP) protocol.

13. The method of claim 1, wherein the control signal is a digital control signal of the high definition multimedia interface (HDMI) protocol.

14. The method of claim 1, further comprising adjusting the settings by utilizing a linear search, a binary tree search, or an importance search to determine the setting that results in the minimal difference between the number of transitions and the reference number of transitions.

15. The method of claim 1, wherein the digital visual receiver circuit is a Digital Visual Interface (DVI) receiver.

16. A method of configuring a digital visual receiver circuit, comprising:
 processing a received digital visual signal with the receiver circuit;
 adjusting each of a plurality of settings relating to the receiver circuit according to a relative effect on signal transmission quality of each of the plurality of settings such that a setting with a largest effect on the signal transmission quality is adjusted first;
 for each of the plurality of adjusted settings, determining a number of transitions of a control signal in the digital visual signal that occur within a time interval;
 utilizing each of the adjusted settings and comparing the number of transitions within the time interval with a reference number of transitions associated with each of the plurality of settings; and
 utilizing an adjusted setting among the plurality of settings that results in a minimal difference between the determined number of transitions and the reference number of transitions.

* * * * *